United States Patent
Witt

(10) Patent No.: US 12,311,830 B1
(45) Date of Patent: May 27, 2025

(54) BULKHEAD FOR TRAILERS AND SHIPPING CONTAINERS

(71) Applicant: AIT Worldwide Logistics, Inc., Itasca, IL (US)

(72) Inventor: Andrew Witt, Torrance, CA (US)

(73) Assignee: AIT Worldwide Logistics, Inc., Itasca, IL (US)

( * ) Notice: Subject to any disclaimer, the term of this patent is extended or adjusted under 35 U.S.C. 154(b) by 0 days.

(21) Appl. No.: 18/776,408

(22) Filed: Jul. 18, 2024

(51) Int. Cl.
*B60P 7/14* (2006.01)

(52) U.S. Cl.
CPC ..................... *B60P 7/14* (2013.01)

(58) Field of Classification Search
CPC .......................................................... B60P 7/14
USPC ......................................................... 410/129
See application file for complete search history.

(56) References Cited

U.S. PATENT DOCUMENTS

| | | | | |
|---|---|---|---|---|
| 2,911,925 A * | 11/1959 | Adler | .................... | B61D 45/006 292/145 |
| 3,297,175 A * | 1/1967 | Gooding | .............. | B61D 45/006 410/129 |
| 3,477,392 A * | 11/1969 | Breen | ........................ | B60P 7/15 410/141 |
| 3,486,468 A * | 12/1969 | McLaughlin | ........ | B61D 45/006 410/141 |
| 3,680,491 A * | 8/1972 | Chapman | ............. | B61D 45/006 410/89 |
| 4,049,311 A | 9/1977 | Dietrich et al. | | |
| 4,498,648 A * | 2/1985 | DeLuca | .................... | B64C 1/22 244/118.3 |
| 5,123,773 A | 6/1992 | Yodock | | |
| 5,882,140 A * | 3/1999 | Yodock, Jr. | ........... | E01F 15/083 404/6 |
| 5,947,812 A * | 9/1999 | Henning | ............... | F25D 17/005 454/91 |
| 6,305,128 B1 * | 10/2001 | Horner | .................... | B60P 3/205 160/40 |
| 6,390,745 B1 * | 5/2002 | Coltea | .................. | B61D 45/006 410/127 |
| 6,843,614 B2 * | 1/2005 | Yodock, Jr. | ............. | E01F 13/12 404/6 |
| 6,981,828 B2 | 1/2006 | Davies et al. | | |
| 2003/0081998 A1 * | 5/2003 | Yodock, III | .......... | E01F 15/083 404/6 |
| 2004/0141807 A1 * | 7/2004 | Yodock, Jr. | ........... | E01F 15/083 404/6 |
| 2007/0206990 A1 * | 9/2007 | Yodock, III | .......... | E01F 15/083 404/6 |
| 2008/0131226 A1 | 6/2008 | Pesson | | |

FOREIGN PATENT DOCUMENTS

| | | | | |
|---|---|---|---|---|
| DE | 102021105025 A1 * | 9/2022 | | |
| EP | 2682667 A2 * | 1/2014 | ............ | F17C 13/084 |
| WO | WO-2021155446 A1 * | 8/2021 | ............ | E02B 3/108 |

* cited by examiner

*Primary Examiner* — Hilary L Gutman
(74) *Attorney, Agent, or Firm* — Womble Bond Dickinson (US) LLP

(57) ABSTRACT

A bulkhead for positioning within a trailer includes the base and the barricade. The barricade has a front wall that extends vertically from the base. The barricade and the base form a barrier that is configured to prevent access beyond the barricade. The bulkhead is configured to maintain its position within the trailer by the weight of the bulkhead alone.

18 Claims, 9 Drawing Sheets

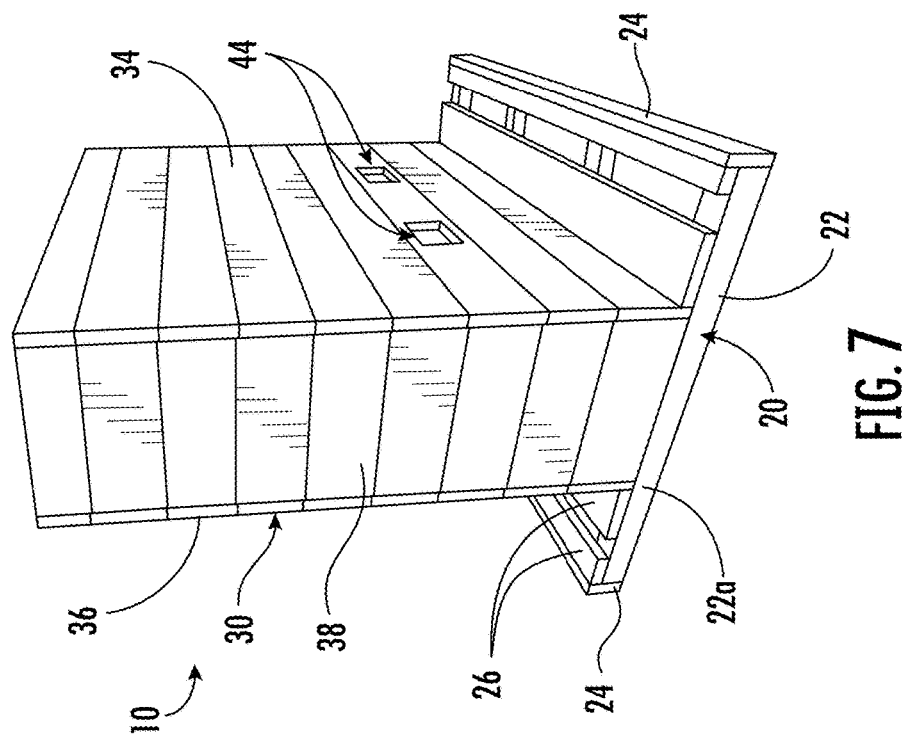
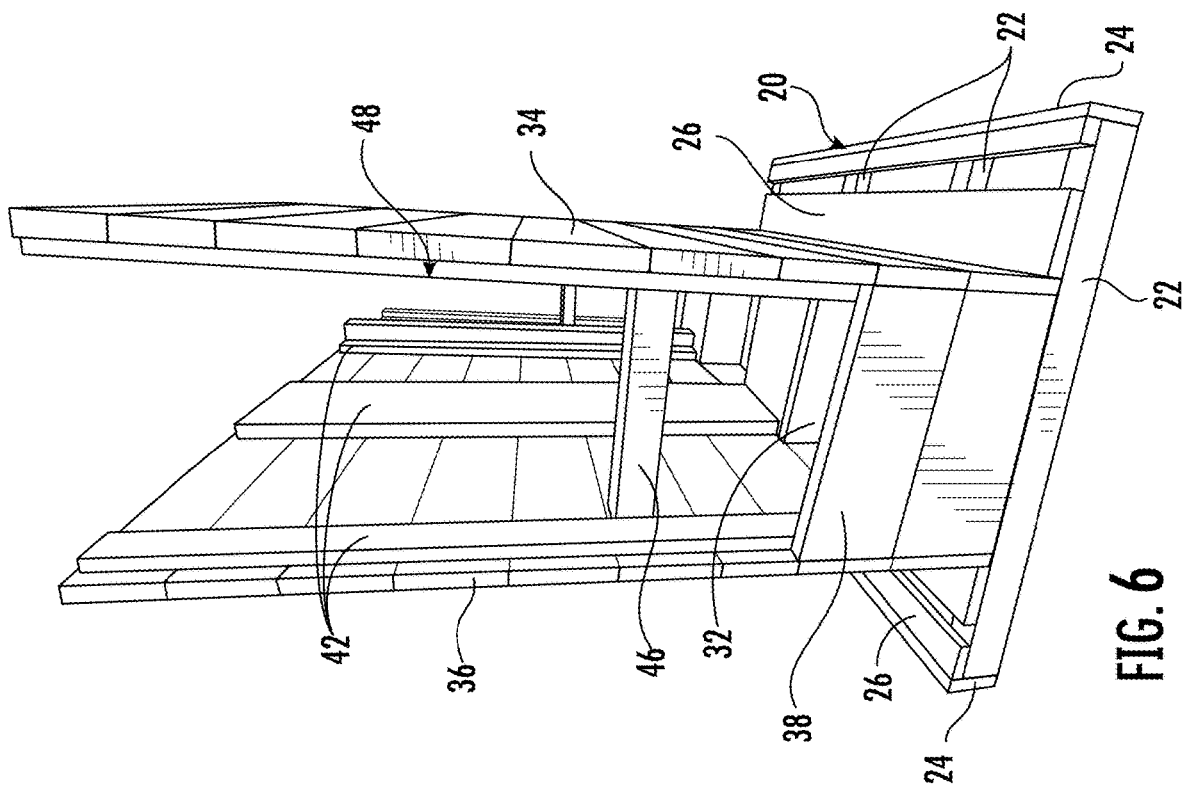
FIG. 7
FIG. 6

BULKHEAD FOR TRAILERS AND SHIPPING CONTAINERS

BACKGROUND

1. Technical Field

The present disclosure relates to trailers or shipping containers and, more specifically, to a bulkhead for protecting contents of a trailer or a shipping container.

2. Discussion of Related Art

Cargo may be transported by a variety of means such as a truck, a tractor-trailer, a shipping container, or a combination thereof which will be referred to generally as a "trailer." During shipping a trailer is typically sealed with a lock or another securement means, e.g., a coded bolt. However, the lock or other securement means may be easily breached with a bolt cutter or other cutting device, e.g., a cutoff wheel or a cutting torch. While it will be obvious upon delivery that the trailer was breached, the lock or other securement means does not prevent theft or damage to the contents of the trailer.

As such, there is a continuing need for means to secure a trailer to prevent theft.

SUMMARY

This disclosure relates generally to a bulkhead that is loaded in a trailer to prevent theft of cargo from the trailer. The bulkheads disclosed herein may only be loaded and unloaded using lifting equipment, e.g., a forklift. Use of the bulkheads disclosed herein may decrease the possibility of theft of cargo. Decreasing the possibility of theft may reduce labor costs and may allow for reduced insurance costs for transporting cargo.

In an aspect of the present disclosure, all bulkheads for position within a trailer include a base and a barricade. The barricade has a front wall that extends vertically from the base. The barricade and the base form a barrier that is configured to prevent access beyond the barricade. The bulkhead is configured to maintain a position of the bulkhead within the trailer by the weight of the bulkhead alone.

In aspects, the barricade may define the first tunnel and the second tunnel that each extend through the first wall. The first tunnel and the second tunnel may be configured to receive a portion of the lifting device to move the bulkhead. The bulkhead may include a flap that is hingedly secured to the front wall. The flap may have an open configuration in which the first tunnel and second tunnel are accessible in the closed configuration in which the flap conceals the first tunnel and the second tunnel. The bulkhead may include a locking system that is configured to maintain the flap in the closed position.

In some aspects, the barricade may include a back wall that extends vertically from the base and is disposed parallel to the front wall. The first tunnel and the second tunnel may extend through the back wall. The barricade may include a first box and a second box that each extend between the front wall and the back wall. The first box may define the first tunnel and the second box may define the second tunnel. The first tunnel and the second tunnel may each be vertically positioned in a range of 18 inches to 36 inches above the base. The bulkhead may have a weight in a range of a 1000 pounds to 2000 pounds.

In another aspect of the present disclosure, a trailer system includes a trailer and a bulkhead. The trailer has a first end and a second end and the trailer defines an interior between the first and second end. The interior has a height, width, and length with the length being defined between the first end and the second end. The second end defines an opening of the trailer. The bulkhead may be any of the bulkheads defined herein. The bulkhead is positioned in the interior of the trailer and has a width and a height that substantially prevents access beyond the barricade of the bulkhead.

In aspects, the bulkhead is positioned adjacent the end of the trailer to substantially prevent access beyond the bulkhead.

In another aspect of the present disclosure, a bulkhead for position within an interior of the trailer includes a base and barricade. The barricade extends vertically from the base and is configured to be disposed within the interior of the trailer such that access beyond the barricade is prevented. The bulkhead has a weight sufficient to prevent the bulkhead from moving within the interior of the trailer as the trailer is transported.

In aspects, the barricade includes a first wall and defines the first tunnel and the second tunnel that extend through the first wall. The first tunnel or the second tunnel may each be configured to receive a portion of the lifting device. The bulkhead may include a flap that is hingedly secured to the front wall. The flap may have an open configuration in which the first tunnel and the second tunnel are each accessible in a closed configuration in which the flap conceals each of the first tunnel and the second tunnel. The bulkhead may include a locking system that is configured to maintain the flap in the closed configuration.

In some aspects, the barricade includes the back wall that extends vertically from the base and is disposed parallel to the front wall. The first tunnel and the second tunnel may each extend through the back wall. The barricade may include a first box and a second box that extends between the front wall and the back wall. The first box may define the first tunnel and the second box may define the second tunnel.

In another aspect of the present disclosure, a method of securing a trailer includes positioning of the bulkhead with a lifting device in an interior of the trailer such that the weight of the bulkhead alone maintains the position of the bulkhead within the interior of the trailer. The bulkhead may substantially prevent access to the interior of the trailer beyond the bulkhead. The method also includes transporting the trailer to another location and removing the bulkhead with another lifting device from the interior of the trailer such that the interior of the trailer beyond the bulkhead is accessible.

In aspects, positioning the bulkhead includes inserting tines of a lifting device into tunnels defined through the bulkhead. The tunnels may be positioned 18 inches to 36 inches above the base of the bulkhead.

In some aspects, the method includes transitioning a flap of the bulkhead from an open configuration in which the tunnels are accessible to a close configuration in which the tunnels are concealed before transporting the trailer. The method may include securing the flap in the close configuration with a locking system before transporting the trailer. The method may include verifying the locking system remained intact during transport after transporting the trailer and before removing the bulkhead.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are not necessarily drawn to scale, which are incorporated in and constitute a part of this specification, wherein:

FIG. 6 is another perspective view showing internal features of the bulkhead of FIG. 1;

FIG. 7 is a perspective view of the bulkhead of FIG. 1 with external layers removed;

DETAILED DESCRIPTION

Figure 1:
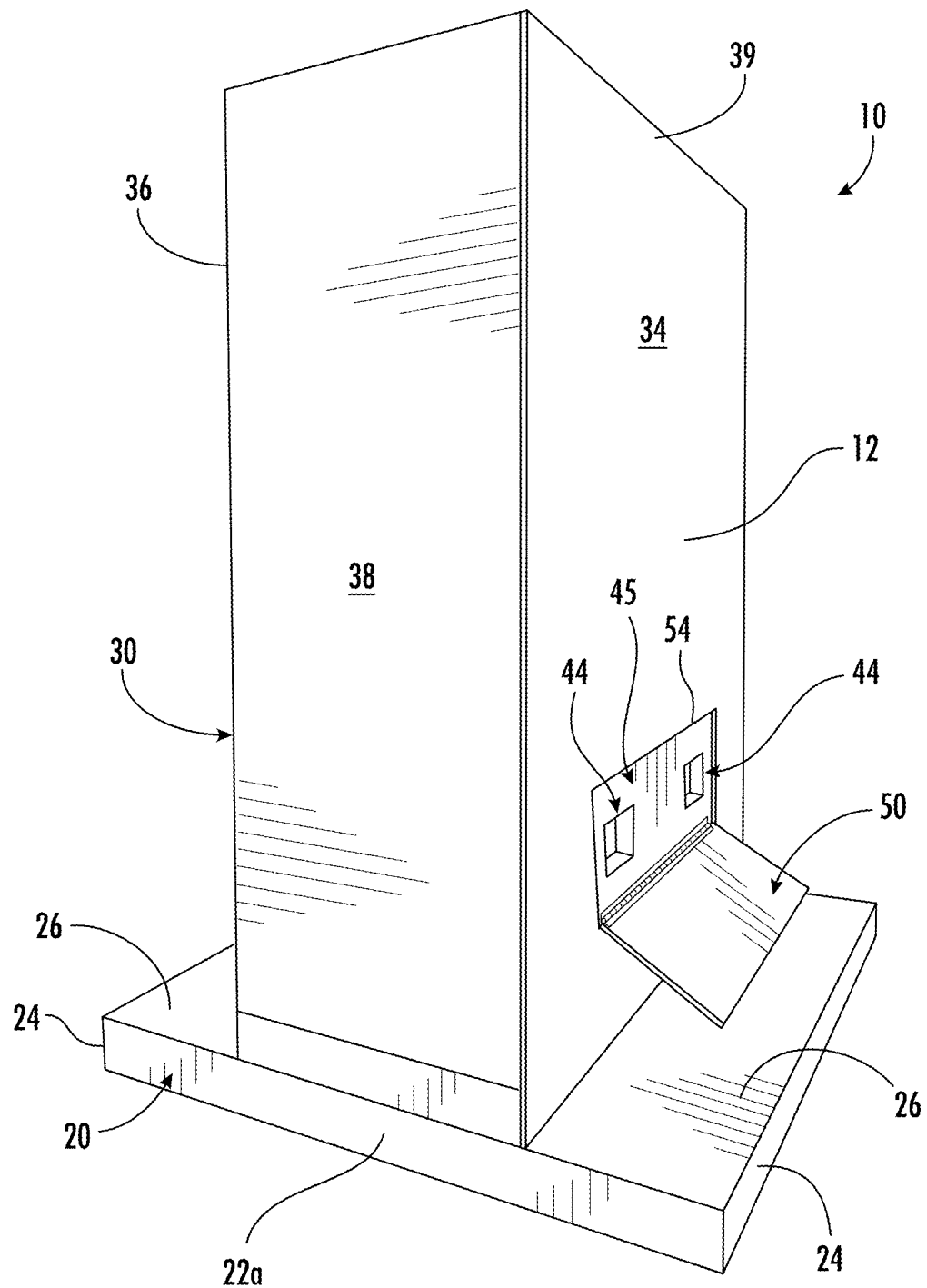
FIG. 1 is a front perspective view of a bulkhead provided in accordance with the present disclosure with a flap in an open configuration thereof.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships, or the like, unless otherwise stated, any one or more if not all of these may be absolute or approximate to account for acceptable variations that may occur, such as those due to manufacturing or engineering tolerances or the like.

As used herein, the term "trailer" refers to an enclosed container that is attached to a truck (e.g., a box truck), a tractor trailer, a shipping container, a standalone trailer (e.g., a 48, 50, or 53 ft trailer), or another enclosed container for transporting cargo.

Referring now to FIG. 1, a security device or bulkhead 10 is provided in accordance with the present disclosure. The bulkhead 10 has a base 20, a barricade 30, and a flap 50. The base 20 and the barricade 30 define the width and height of a barrier 12 having dimensions substantially equal to the height and width of a respective trailer in which the bulkhead 10 is configured to be used. For example, each of the width and the height of the barrier 12 may be 1 inch to 12 inches less than the interior height and the interior width of the respective trailer for which the barrier 12 is intended to be used such that there is some clearance for inserting and removing the bulkhead 10 while substantially preventing access to a section of the interior of the trailer which is in front of the barrier 12. It will be appreciated that while there may be some clearance around the barrier 12, the barrier 12 prevents a person from passing by the barrier 12 and from cargo in front of the barrier 12 from being taken out of the trailer without removal of the bulkhead 10. The clearance between the dimensions of the barrier 12 and the interior dimensions of the trailer may allow for insertion and removal of the bulkhead 10. In some embodiments, a trailer may have an interior width of 100 inches and an interior height of 111 inches and a barrier 12 for use within the trailer may have a width of 96 inches and a height of 100 inches or 107 inches. In embodiments, the height of the barrier 12 is in a range of 90 inches to 108 inches.

Figure 3:
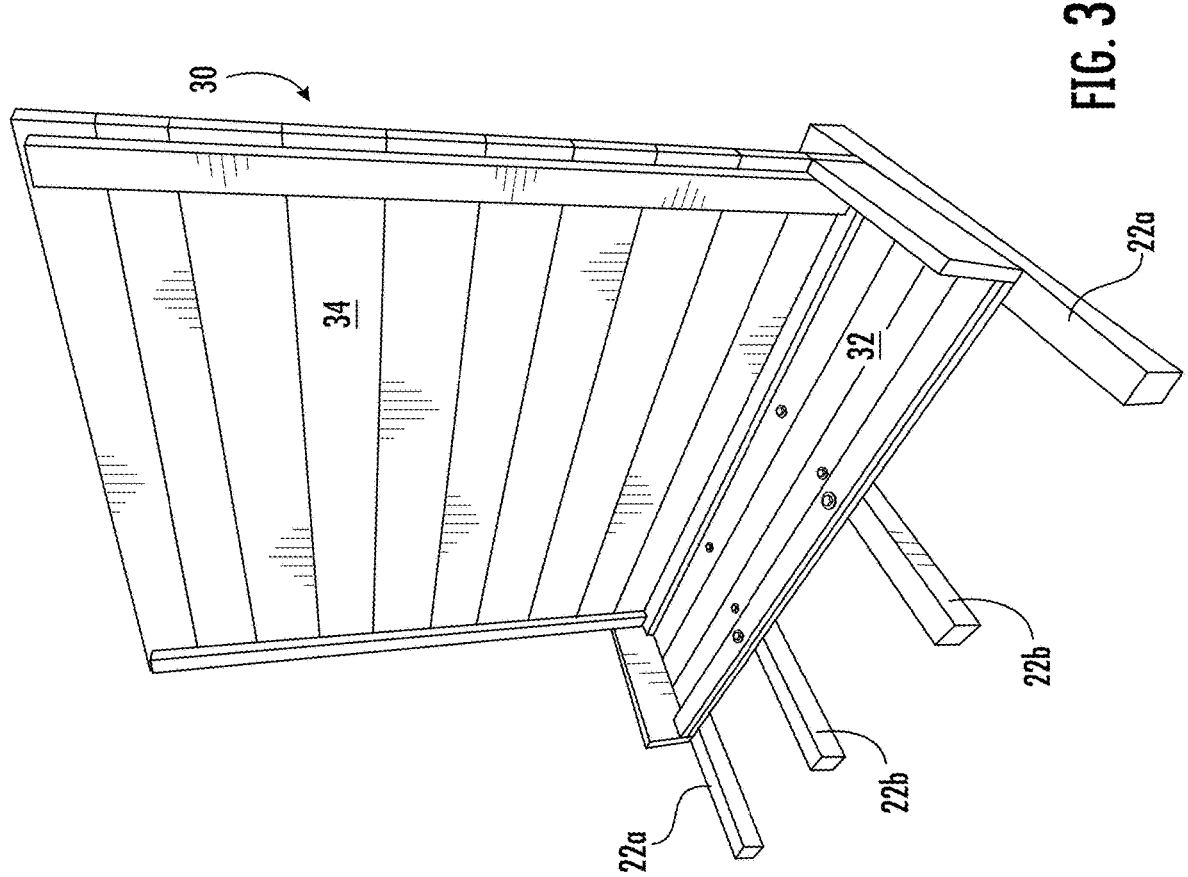
FIG. 3 is a rear perspective view of the partially disassembled bulkhead of FIG. 2.
Figure 2:
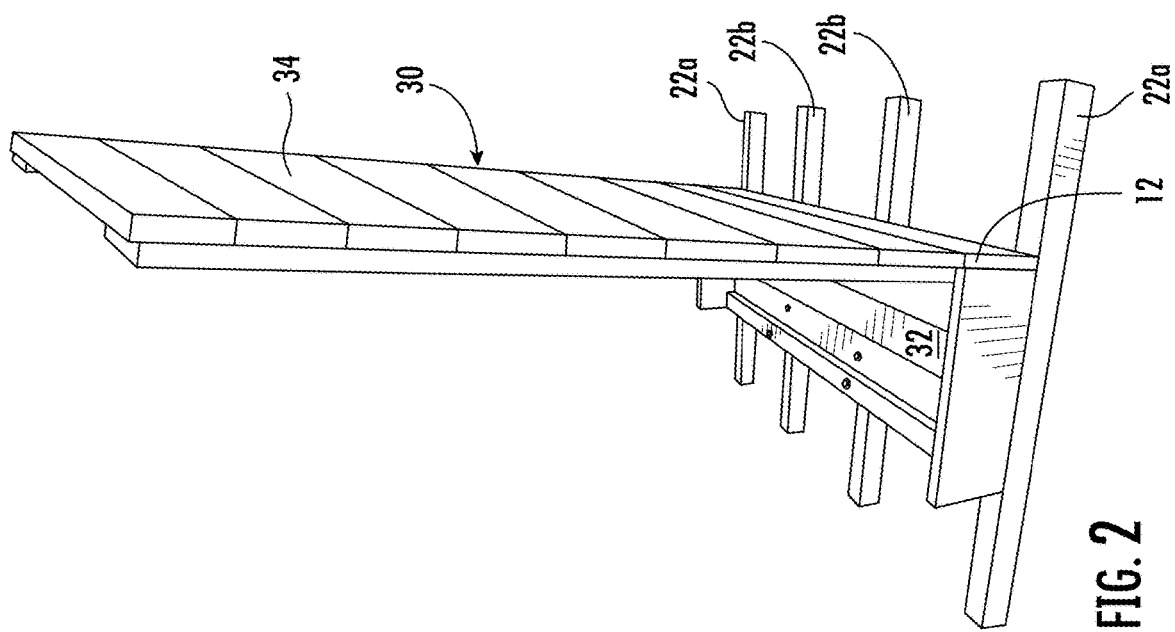
FIG. 2 is a front perspective view of the bulkhead of FIG. 1 partially disassembled.

With additional reference to FIGS. 2 and 3, the base 20 may be formed of a plurality of foot boards 22 that substantially define and substantially extend the length of the base 20 of the bulkhead 10. The length of the base 20 may provide stability to the bulkhead 10 such that the base 20 prevents the bulkhead 10 from being tipped over in a direction parallel to the length of the bulkhead 10 which is orthogonal to a plane defined by the barrier 12. The length of the base 20 may be less than the width or the height of the bulkhead 10. In some embodiments, the length of the base 20, and thus the bulkhead 10, may be in a range of 48 inches to 84 inches, e.g., 60, 65, or 70 inches.

Each of the foot boards 22 may extend substantially parallel to one another. The number of foot boards 22 may depend on the width of the bulkhead 10. As shown, the base 20 includes four-foot boards 22 that are equally spaced apart from one another. Of the foot boards 22, two of the foot boards 22, which may be referred to as the outer foot boards 22a, are spaced apart from one another to define the width of the bulkhead 10. The other foot boards 22 may be referred to as the interior foot boards 22b may be parallel to the outer foot boards 22a or may be askew relative to the outer foot boards 22a. In some embodiments, some interior foot boards 22b may be parallel to the outer foot boards 22a and other interior foot boards (not explicitly shown) may be askew relative to the outer foot boards 22a. The base 20 may include cross-brace boards that extend between the other boards 22 and maintain a space between the respective foot boards 22.

The base 20 also includes end boards 24 that extend over the foot boards 22 to cover the ends of the foot boards 22. The end boards 24 are perpendicular to the foot boards 22 such that the end boards 24 are parallel to one another and define the length of the base 20. The end boards 24 may prevent access to the bottom of the bulkhead 10. For example, the end boards 24 may prevent access under the bulkhead 10 by a pallet jack, forklift tines, or other lifting device. In some embodiments, cross-brace boards or askew foot boards in the base 20 may prevent access under the bulkhead 10 by a pallet jack, forklift tines, or other lifting device. In certain embodiments, the height of the foot boards 22 may be less than a height of a pallet jack, forklift tines, or other lifting device such that a pallet jack, forklift tines, or other lifting equipment is unable to be inserted into or under the base 20 of the bulkhead 10.

The end boards 24 may be secured to the ends of the foot boards 22 by one or more fasteners that extend through the end boards 24. In some embodiments, the end boards 24 may be secured from within the base 20 such that fasteners securing the end boards 24 to the foot boards 22 are not accessible from a backside of the bulkhead 10. In some embodiments, the end boards 24 may be secured with nails driven into the end boards 24 such that the heads of the nails are positioned below a surface of the end boards 24 such that the nails are difficult to be removed.

Referring briefly back to FIG. 1, the base 20 also includes cover boards 26 that are secured to the top of the foot boards 22. The cover boards 26 may prevent access to the foot boards 22 and may block access under the base 20. The cover boards 26 may be sheets of plywood or a plurality of individual boards that are secured to the top of the foot-boards such that there are substantially no gaps between adjacent cover boards 26. In certain embodiments, the cover boards 26 include a first layer which is formed by a plurality of boards that each extend between and perpendicular to the outer foot boards 22a. The first layer may be a solid layer with substantially no gap between adjacent boards or may include some spaces between the cover boards 26. The second layer may be a single plywood board that extends between the respective end board 24 and the barricade 30.

With reference to FIGS. 4-7, the construction of the barricade 30 is described in accordance with the present disclosure. The barricade 30 includes a floor 32, a front wall 34, a back wall 36, and side walls 38. The front wall 34, the back wall 36, and the side walls 38 may define a cavity 48 within the barricade 30. The floor 32 may define a bottom of the cavity 48. In certain embodiments, the barricade 30 includes a roof 39 (FIG. 1) that defines a top of the cavity 48 such that the cavity 48 is sealed. In particular embodiments, the cavity 48 may be empty. In other embodiments, the cavity 48 may be partially or completely filled with filler material. The filler material may act as ballast to increase a weight of the bulkhead 10 as detailed below.

The floor 32 is secured to the top of the foot boards 22 separate from the cover boards 26. The floor 32 may be secured with one or more fasteners that pass through the floor 32 and into the foot boards 22. The floor 32 may provide support for the front wall 34, the back wall 36, and the side walls 38. For example, the floor 32 may space the front wall 34 from the back wall 36 along the length of the base 20. In some embodiments, the bottom of the front wall 34 and the back wall 36 may be secured to the floor 32 by fasteners that are positioned below the cover boards 26 such that the fasteners are not accessible once the cover boards 26 are secured to the foot boards 22. In some embodiments, the barricade 30 may be constructed without a floor 32.

The front wall 34 and the back wall 36 may be constructed as separate elements before being secured to the base 20. For example, each of the front wall 34 and the back wall 36 may include a plurality of boards that are arranged horizontally with substantially no gaps defined between adjacent boards. In such embodiments, the front wall 34 and the back wall 36 may each include braces 42 that extend the height of the barricade 30. The braces 42 may support the plurality of boards forming the respective wall relative to one another. In certain embodiments, the front wall 34 and/or the back wall 36 may be formed of one or more sheets of plywood. In such embodiments, the braces 42 may reinforce the respective front wall 34 or the back wall 36. It will be appreciated that the braces 42 may reinforce the respective wall formed of a plurality of boards. In certain embodiments, the front wall 34 and/or the back wall 36 may have a multiple layers. For example, an inner layer may be formed of a plurality of horizontal boards and an outer layer may be formed of one or more sheets of plywood.

Figure 5:
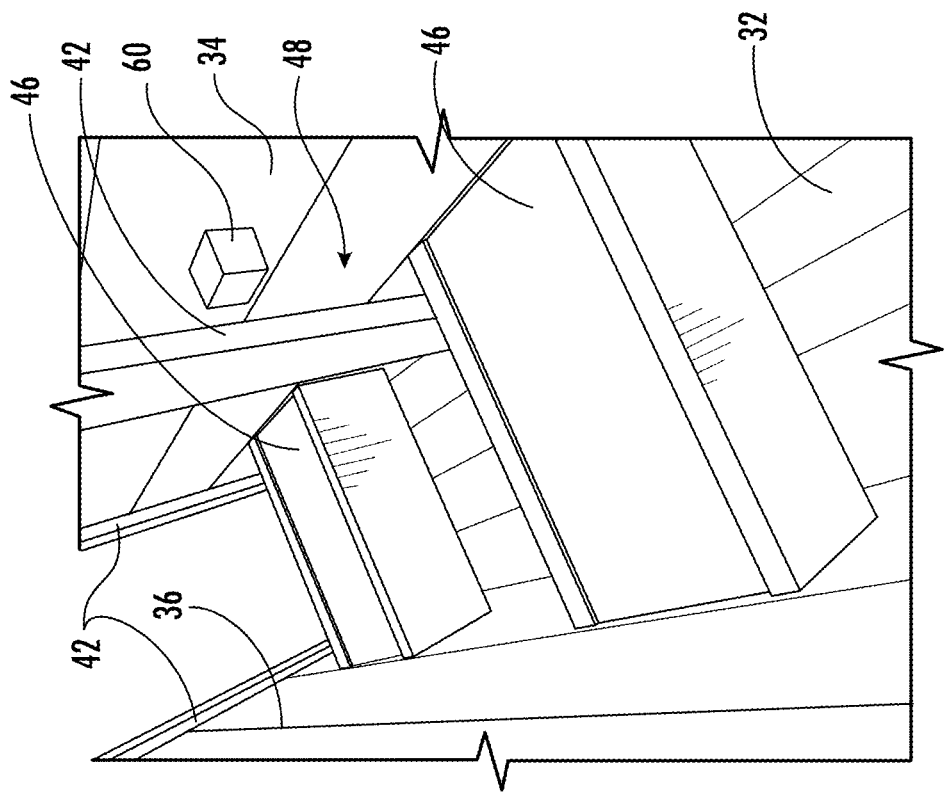
FIG. 5 is a perspective view of internal features of the bulkhead of FIG. 1.
Figure 4:
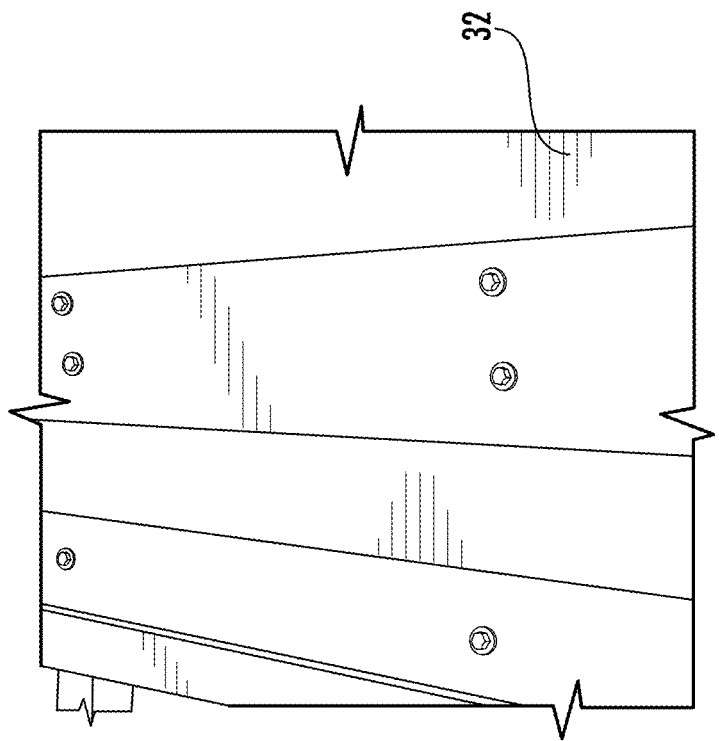
FIG. 4 is a top view of a floor of the bulkhead of FIG. 1.

With particular reference to FIGS. 5 and 7, the barricade 30 defines two tunnels 44 that are horizontally spaced apart from one another and are vertically equal to one another. The tunnels 44 pass horizontally through the front wall 34 and the back wall 36 and are configured to receive tines of a forklift or other lifting device therethrough. The barricade 30 may include boxes 46 that extend between the front wall 34 and the back wall 36. The boxes 46 may be configured to guide tines of a forklift or other lifting device through the tunnels 44. In some embodiments, the boxes 46 may maintain a distance between the front wall 34 and the back wall 36. Guiding the tines of a forklift through the tunnels 44 may decrease damage to the front wall 34 and the back wall 36 as a forklift engages the tunnels 44 as detailed below. A top section of the box 46 may allow for lifting of the bulkhead 10 without tines of a forklift extending all the way through the barricade 30. For example, in some embodiments, the back wall 36 may not define a tunnel 44 such that tines of the forklift extend through the front wall 34, into the tunnels 44, and not through the back wall 36. The tunnels 44 may be vertically positioned at a height of 18 inches to 36 inches, e.g., 24 inches, above the base. The vertical position of the tunnels 44 may make it difficult to lift and/or move the bulkhead 10 without a forklift or other mechanized lifting device. Requiring such a lifting device may prevent the bulkhead 10 from being removed from the trailer if the trailer is opened without a proper loading dock, e.g., during transport.

The barricade 30 may include a tracking device 60 that allows for remote tracking of the bulkhead 10. The tracking device 60 may be secured within the cavity 48 of the bulkhead 10, e.g., a rear side of the front wall 34; to an exterior of the bulkhead 10, e.g., a rear side of the back wall 36; or in a tunnel 44 of the bulkhead 10. The tracking device 60 may be a global-positioning system tracking device that allows for remote tracking of the bulkhead 10, and thus a trailer including the bulkhead 10.

The side walls 38 extend between the front wall 34 and the back wall 36. The side walls 38 may be formed of a plurality of horizontal boards that are stacked relative to one another and/or may be formed of one or more sheets of plywood. The end portions of the side walls 38 adjacent the respective front wall 34 and the back wall 36 may be secured to a brace 42 that extends adjacent the side wall 38. For example, the side wall 38 may be secured with one or more fasteners that pass through the side wall 38 into the brace 42. The side walls 38 may maintain a space between the front wall 34 and the back wall 36. In some embodiments, the side walls 38 may be formed of multiple layers. For example, an inner layer may be formed with a plurality of boards horizontally stacked relative to one another and an outer layer may be formed of one or more sheets of plywood.

Figure 9:
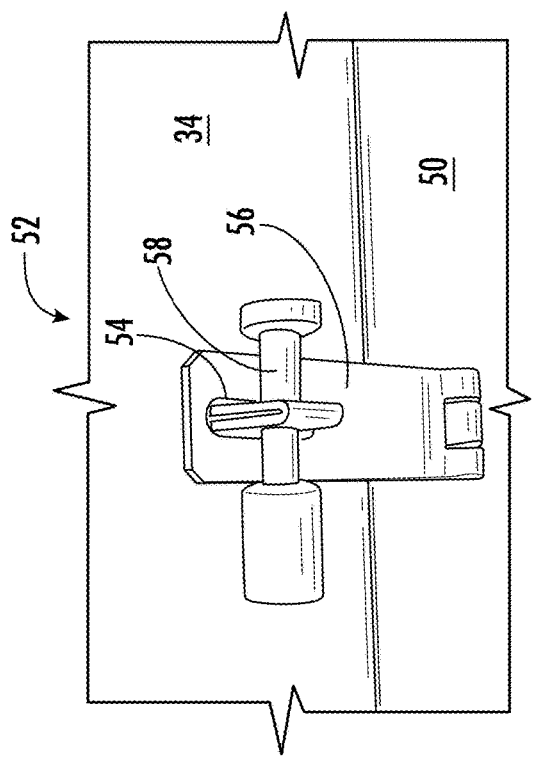
FIG. 9 is an enlarged view of a portion of the bulkhead of FIG. 8 illustrating the locking system.
Figure 8:
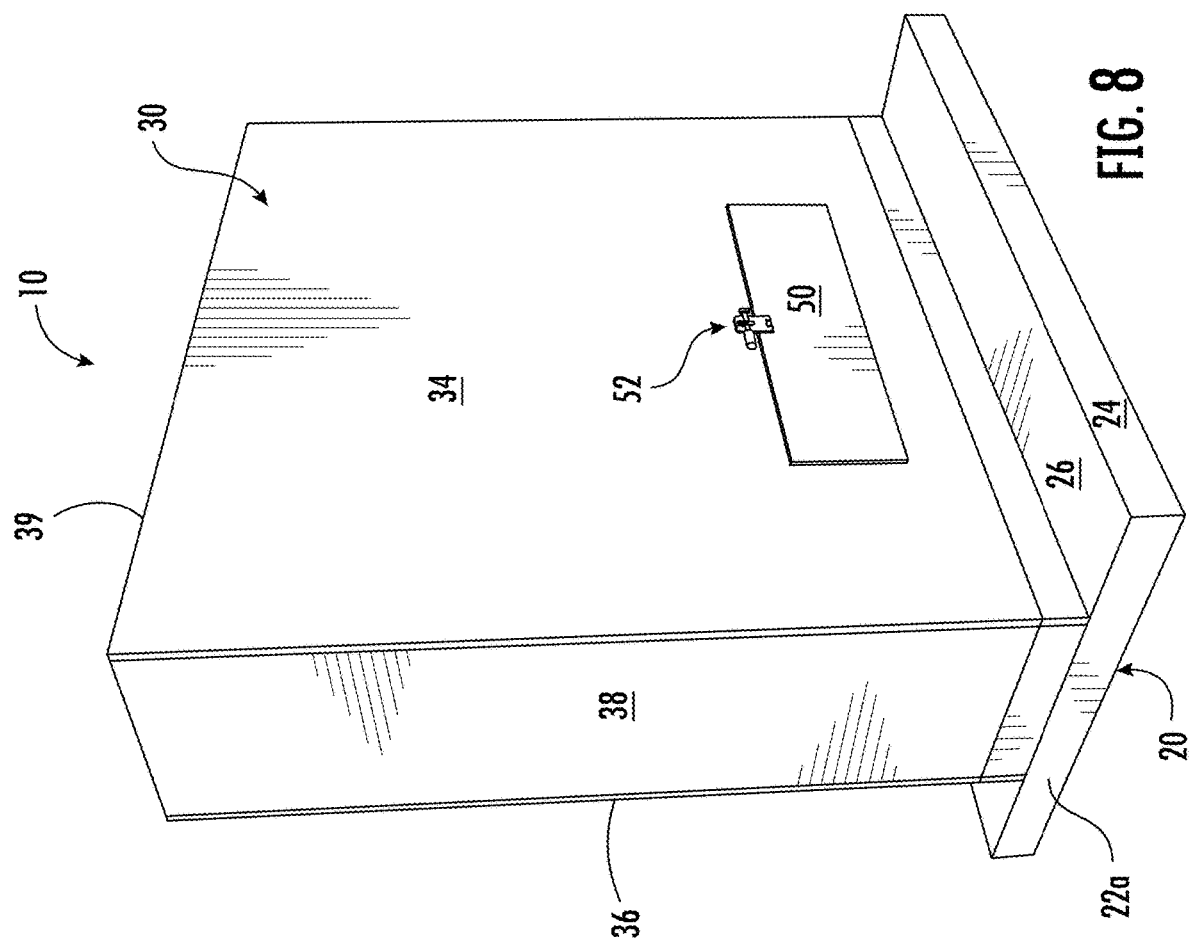
FIG. 8 is a perspective view of the bulkhead of FIG. 1 with the flap in a closed configuration and a locking system in a secured state.
Figure 10:
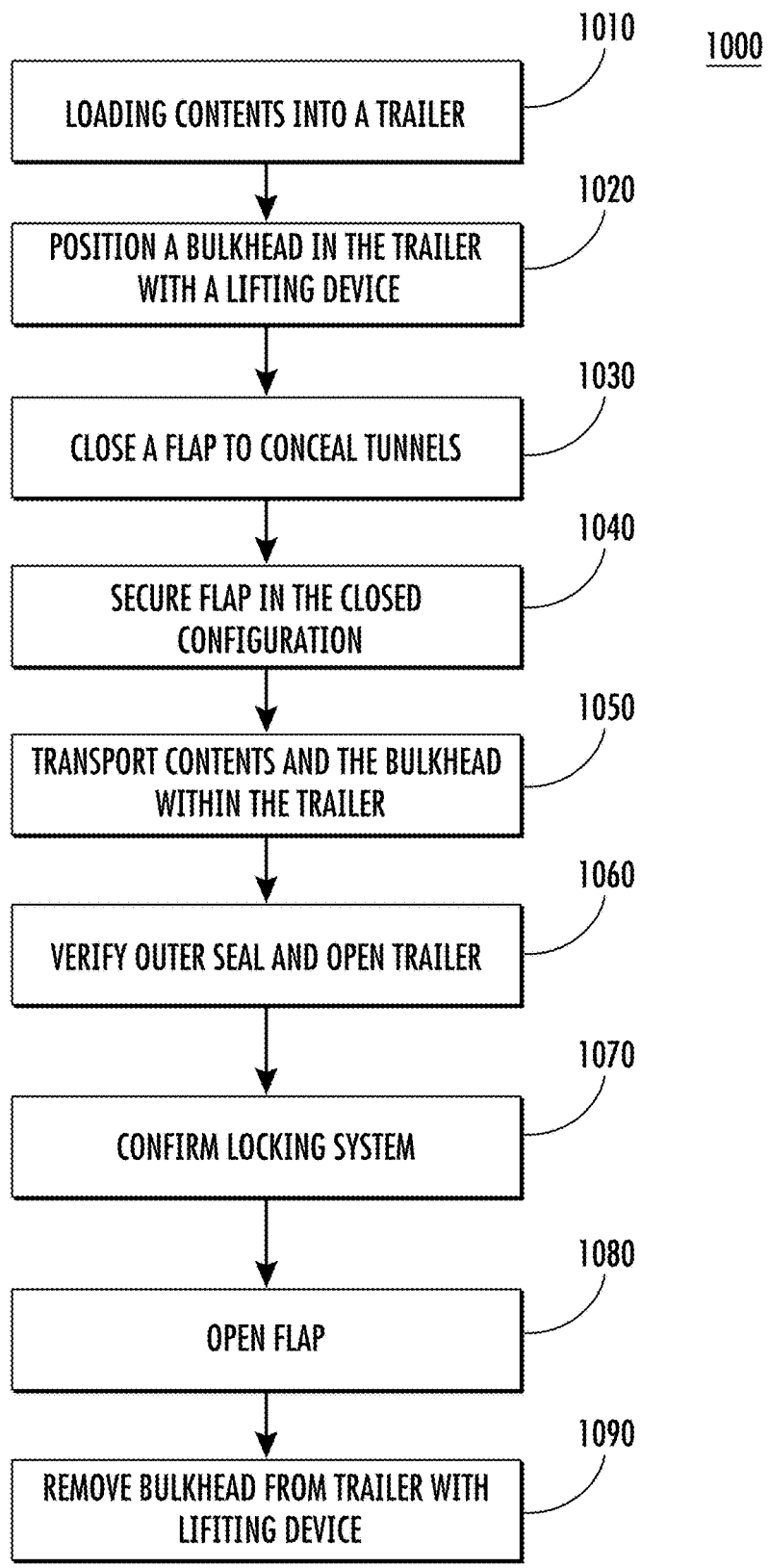
FIG. 10 is a method of securing a trailer provided in accordance with the present disclosure.
Figure 11:
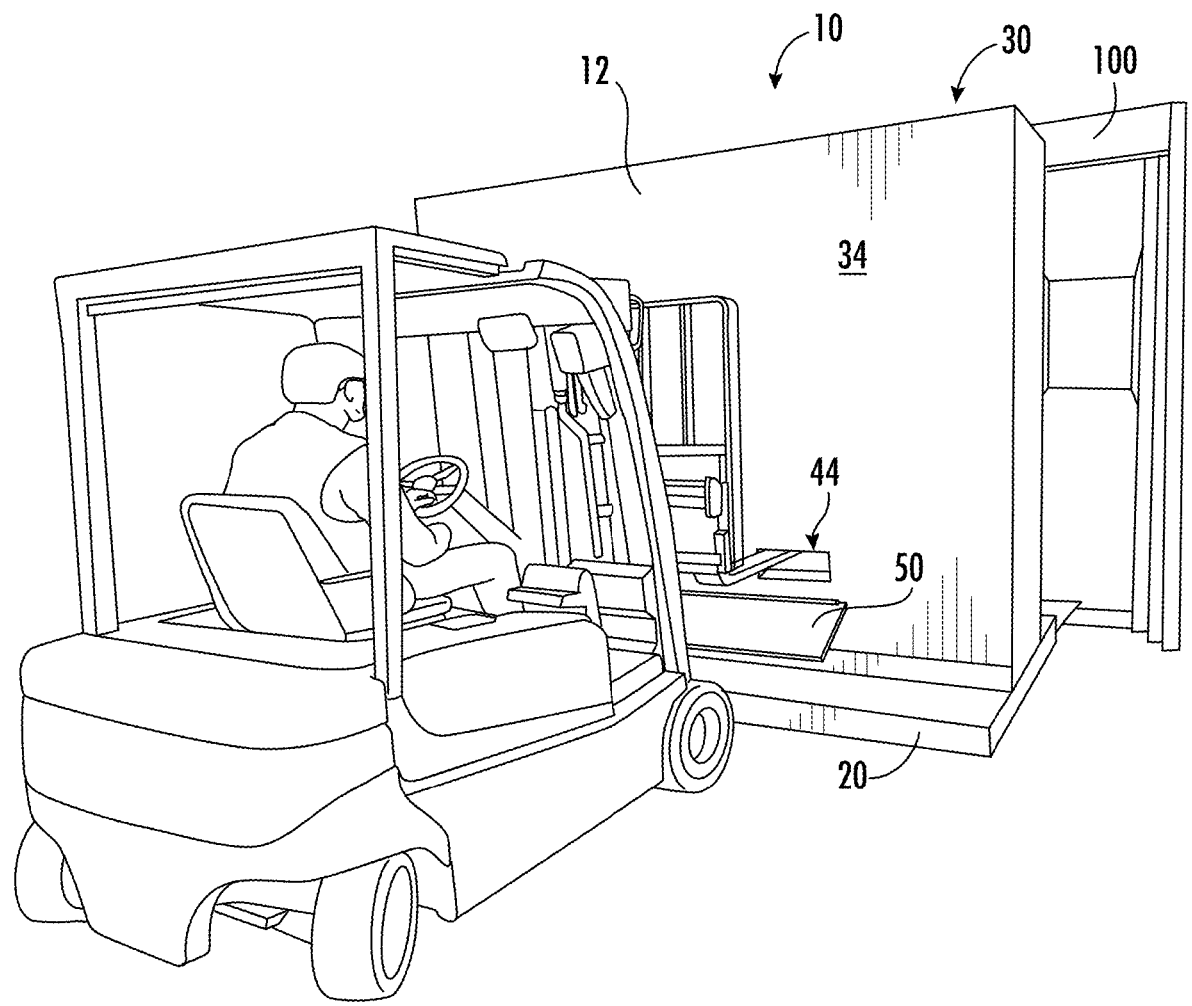
FIG. 11 is a perspective view of the bulkhead of FIG. 1 being positioned in a trailer in accordance with the present disclosure.
Figure 12:
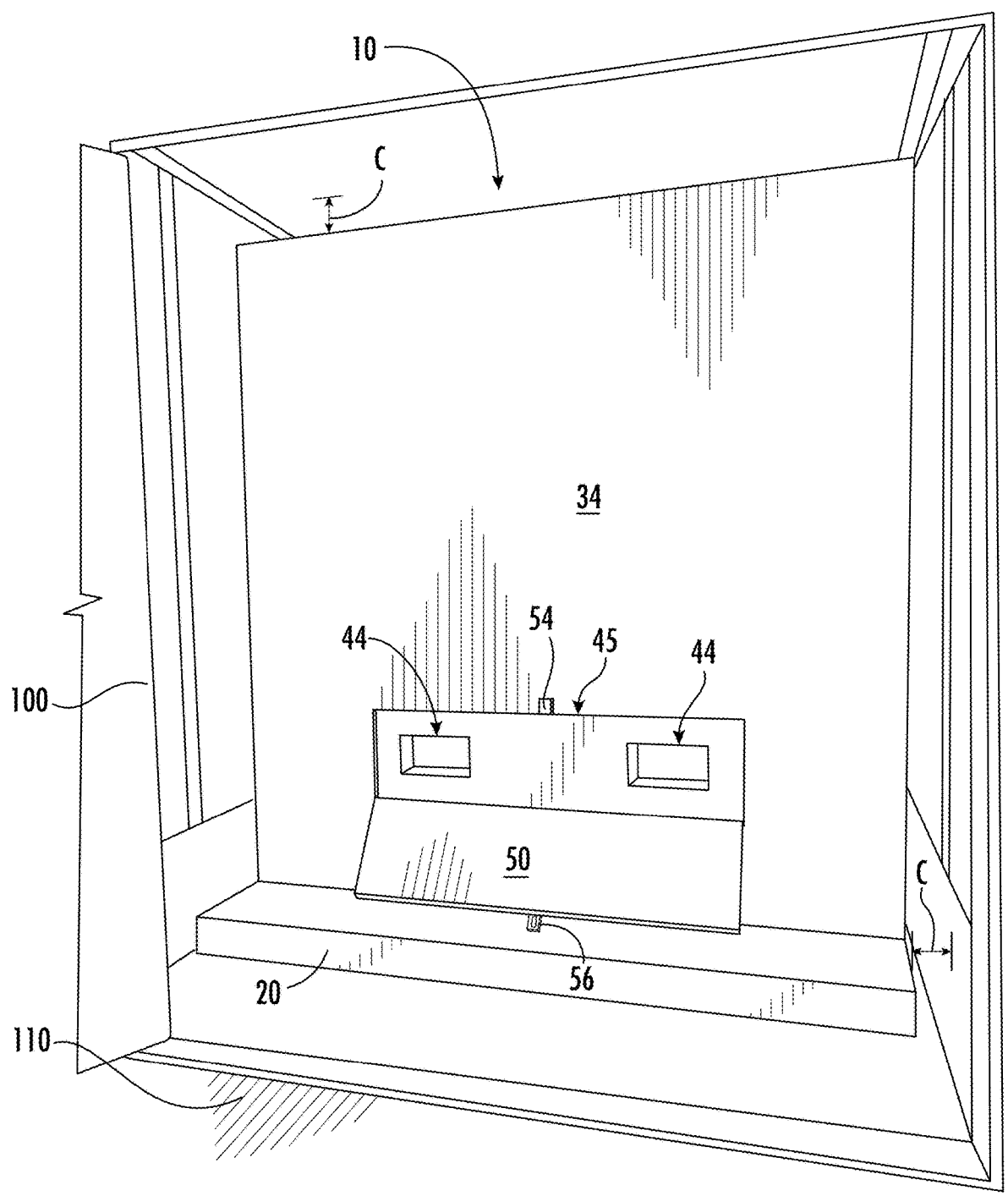
FIG. 12 is a perspective view of the bulkhead of FIG. 1 positioned in a trailer in accordance with the present disclosure with the flap in an open configuration.
Figure 13:
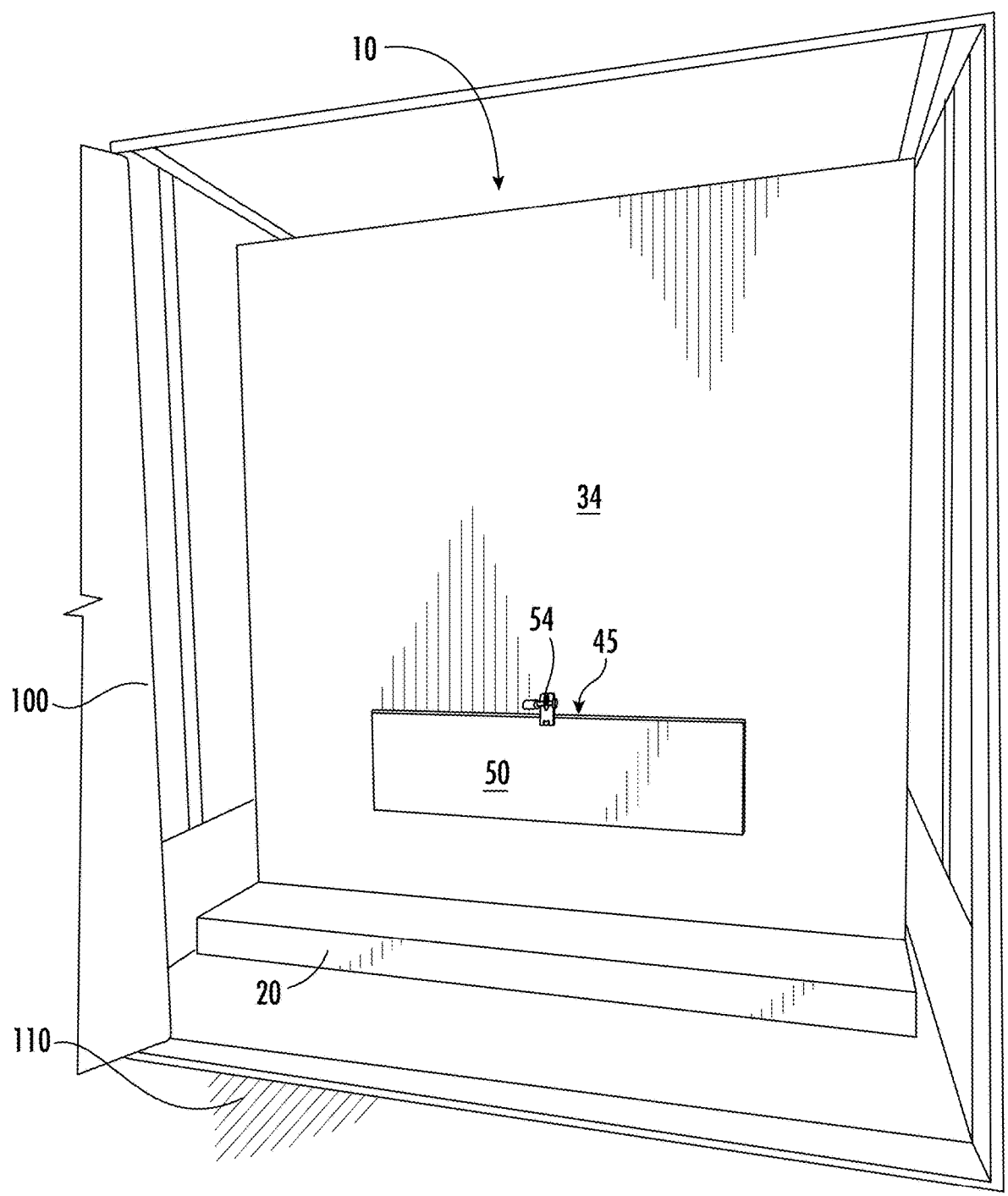
FIG. 13 is a perspective view of the bulkhead of FIG. 12 with the flap in the closed configuration and the locking system in a secured state.

Referring now to FIGS. 8 and 9, the bulkhead 10 includes a flap 50 that is hingedly mounted to the front wall 34. The flap 50 includes a locking system 52 that is configured to maintain the flap 50 in a closed configuration as shown in FIGS. 8 and 9. In the closed configuration, the flap 50 covers the tunnels 44 such that the tunnels 44 are concealed and the flap 50 prevents access to the tunnels 44. The locking system 52 includes a staple 54 that is secured to the front wall 34 and a hasp 56 that is secured to the flap 50. In the closed position, the staple 54 passes through the hasp 56 and receives a locking member 58 therethrough which maintains the hasp 56 within the staple 54 such that the locking system 52 is in a secured state. The locking member 58 may be a coded bolt, a lock, a coded tie, or other element to maintain the staple 54 within the hasp 56. The locking member 58 may allow for detection of tampering when the bulkhead 10 is accessed at a destination as detailed below, e.g., verifying the locking system remained intact during transport. In certain embodiments, the front wall 34 may define a recess 45 (FIG. 1) that is sized and dimensioned to at least partially receive the flap 50 such that a portion of the flap 50 is received within the front wall 34. In such embodiments, the recess 45 may be defined in an outer layer of the front wall 34.

Referring briefly back to FIG. 1, the flap 50 has an open configuration in which the locking system 52 is in an unsecured state. In the open configuration of the flap 50, the tunnels 44 are exposed and accessible by a lifting device, e.g., a forklift.

As detailed below, the bulkhead 10 is configured to be placed in a trailer to prevent access to contents of the trailer in front of the bulkhead 10. The position of the bulkhead 10 within the trailer may be maintained by the weight of the bulkhead 10. For example, the materials that form the base 20 and the barricade 30 may be between 1000 pounds and 2000 pounds, e.g., 1250 pounds or 1500 pounds. In certain embodiments, ballast may be placed inside the cavity 48 of the barricade 30 such that the bulkhead 10 has a weight in a range of 1000 pounds and 2000 pounds. In certain embodiments, the bulkhead 10 and/or ballast within the bulkhead 10 may have a combined weight greater than 2000 pounds. As such, due to the weight of the bulkhead 10, lifting equipment is required to move the bulkhead 10.

With reference to FIGS. 10-13, a method of securing a trailer 100 is provided in accordance with the present disclosure with reference to the bulkhead 10 of FIGS. 1-9. The method 1000 may include loading a trailer 100 with contents to be secured (Step 1010). The contents may fill the trailer 100 or may partially fill the trailer 100. In certain embodiments, the contents may only partially fill a height, a width, or length of the trailer 100. The length of the trailer 100 is defined between a first end and a second end of the trailer 100 with the opening 110 being disposed at the second end of the trailer 100. During loading of the trailer 100, a space is left empty between an opening 110 of the trailer 100 and the contents loaded into the trailer 100.

When the trailer 100 is loaded with the contents, a lifting device, e.g., a forklift, is used to position a bulkhead 10 for the respective trailer 100 into position within the trailer 100 (Step 1020). The bulkhead 10 for the respective trailer 100 is sized such that small clearances around the bulkhead 10 within the interior of the trailer 100 are provided. For example, the clearances may total 1 inch to 12 inches in height and 1 inch to 12 inches in width. The clearances allow the bulkhead 10 to be positioned within the trailer 100 but substantially prevent access to contents of the trailer 100 in front of the bulkhead 10. To position the bulkhead 10, the flap 50 of the bulkhead 10 is in the open configuration (FIG. 1) such that the tunnels 44 are accessible. With the flap 50 in the open configuration, tines of a lifting device are passed through the tunnels 44 and the bulkhead 10 is lifted. With the bulkhead 10 lifted, the lifting device is used to position the bulkhead 10 within the trailer 100. The bulkhead 10 may be positioned next to a last piece of the contents of the trailer 100. In certain embodiments, the bulkhead 10 may be positioned within a predetermined distance from the opening 110 of the trailer 100. The predetermined distance from the opening 110 may be in a range of 2 feet to 6 feet, e.g., 4 feet. The predetermined distance may reduce the possibility of lifting equipment accessing the bulkhead 10 without a loading dock or loading ramp. Reducing the possibility of lifting equipment accessing the bulkhead 10 without a proper loading dock may prevent unauthorized access to the contents of the trailer 100 in front of the bulkhead 10. It will be appreciated that due to the weight of the bulkhead 10, a mechanized lifting device may be required to lift and position the bulkhead 10. Positioning the bulkhead 10 a predetermined distance from the opening 110 may require a loading dock or loading ramp for the lifting device to access the bulkhead 10 such that the bulkhead 10 can be positioned or removed from the trailer 100.

With the bulkhead 10 positioned in the trailer 100, the lifting device is removed and the flap 50 is secured in the closed configuration by the locking system 52 (Step 1030). In the closed configuration, the flap 50 covers and conceals the tunnels 44. The locking system 52 may be secured in the secured state by a locking member 58 such as a seal or other member to deter access to the tunnels 44. In some embodiments, the locking member 58 may be numbered or coded to detect tampering with the bulkhead 10 or the contents. In some embodiments, a tracking device, e.g., tracking device 60, may be activated before or after the bulkhead 10 is loaded into the trailer 100. For example, when the tracking device 60 is secured to the back wall 36 of the bulkhead 10, the tracking device 60 may be activated before loading the bulkhead 10. Additionally or alternatively, a tracking device 60 may be inserted into one or both of the tunnels 44 before closing the flap 50. With the flap 50 in the closed configuration with the locking system 52 in the secured state, the opening 110 of the trailer 100 may be closed by doors of the trailer (not explicitly shown) which are secured with a latch and/or an external seal (Step 1040).

The trailer 100, including the contents and the bulkhead 10, may be transported to a desired destination with the flap 50 in the closed configuration and the opening 110 of the trailer 100 closed (Step 1050). At the desired destination, the opening 110 of the trailer 100 is opened (Step 1060). Before the opening 110 is opened, a seal on the opening 110 may be verified to confirm that the opening 110 was not compromised since being closed. Verifying the seal of the opening 110 may confirm the contents of the trailer 100 were not tampered with or accessed during transport. Once the opening 110 is opened, the locking system 52 may be confirmed or verified in the secured state (Step 1070). The locking system 52 may be confirmed or verified by reviewing the locking member 58. With the locking system 52 confirmed or verified, the flap 50 is transitioned to the open configuration by unsecuring the locking system 52 (Step 1080).

With the flap 50 in the open configuration, another lifting device, e.g., forklift, may be used to remove the bulkhead 10 (Step 1090). Specifically, tines of the lifting device are inserted into the tunnels 44 of the bulkhead 10 and the bulkhead 10 is removed from the trailer 100 such that the contents of the trailer 100 are accessible. With the contents of the trailer 100 accessible, the contents of the trailer 100 may be unloaded.

The bulkhead 10 described herein may be used to prevent access or tampering to contents of a trailer. The weight of the bulkhead 10 may be an obstacle to access the contents of a trailer. It will be appreciated that in shipping, the total weight of a trailer may be an important factor in shipping. For example, the more a trailer weighs, the more fuel will be expended to transport the trailer. In addition, the total weight of a trailer may be regulated such that the weight of the bulkhead 10 may reduce the total amount of cargo that can be transported in the trailer. In some applications, the bulkhead 10 may be used for the transport of high-value cargo. In such applications, the high-value cargo may not fill a trailer and may not be near a regulated weight limit for a trailer such that the weight of the bulkhead 10 will not be a shipping concern.

Although the method steps are described in a specific order, it should be understood that other steps may be performed in between described steps, described steps may be adjusted so that they occur at slightly different times, or the described steps may occur in any order unless otherwise specified.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A bulkhead comprising:
   a base; and
   a barricade having a front wall having a substantially continuous major surface that extends vertically from the base to a top of the barricade, the barricade defining a first tunnel and a second tunnel that extend through the front wall, the first tunnel and the second tunnel configured to receive a portion of a lifting device to move the bulkhead, the first tunnel and the second tunnel vertically positioned in a range of 18 inches to 36 inches above the base, the bulkhead configured to be positioned within a trailer such that the barricade and the base form a barrier to prevent removal of cargo from beyond the bulkhead, the bulkhead configured to maintain position within the trailer by weight of the bulkhead alone.

2. The bulkhead according to claim 1, further comprising a flap hingedly secured to the front wall, the flap having an open configuration in which the first tunnel and the second tunnel are accessible and a closed configuration in which the flap conceals the first tunnel and the second tunnel.

3. The bulkhead according to claim 2, further comprising a locking system that is configured to maintain the flap in the closed configuration.

4. The bulkhead according to claim 2, wherein the barricade includes a back wall that extends vertically from the base and is disposed parallel to the front wall, the first tunnel and the second tunnel extending through the back wall.

5. The bulkhead according to claim 4, wherein the barricade includes a first box and a second box that extend between the front wall and the back wall, the first box defining the first tunnel and the second box defining the second tunnel.

6. The bulkhead according to claim 1, wherein the bulkhead has a weight in a range of 1000 pounds to 2000 pounds.

7. The bulkhead according to claim 1, wherein the base has a front end that defines the frontmost end of the bulkhead, the base having cover boards defining a top surface of the base, the front wall being spaced apart from the front end of the base such that one or more cover boards of the base are disposed between the front end and the front wall.

8. The bulkhead according to claim 1, wherein the base includes cover boards that extend horizontally to form a top surface of the base that is vertically spaced apart from a bottom surface of the base.

9. A trailer system comprising:
   a trailer having a first end and a second end, the trailer defining an interior between the first end and the second end, the interior having a height, width, and length, the length defined between the first end and the second end, the second end defining an opening; and
   a bulkhead according to claim 1, the bulkhead positioned in the interior of the trailer, a barrier of the bulkhead having a width and a height to prevent access beyond the barricade.

10. The trailer system according to claim 9, wherein the bulkhead is positioned adjacent the second end of the trailer to prevent access beyond the bulkhead.

11. A bulkhead comprising:
    a base; and
    a barricade having a substantially continuous major surface extending vertically from the base, the barricade defining a first tunnel and a second tunnel that extend through the barricade, the first tunnel and the second tunnel configured to receive a portion of a lifting device, the first tunnel and the second tunnel vertically positioned in a range of 18 inches to 36 inches above the base, the barricade configured to be disposed within the interior of the trailer such that human access beyond the barricade is prevented, the bulkhead having a weight sufficient to prevent the bulkhead from moving within the interior of the trailer as the trailer is transported.

12. The bulkhead according to claim 11, further comprising a flap hingedly secured to a front wall of the barricade, the flap having an open configuration in which the first tunnel and the second tunnel are accessible and a closed configuration in which the flap conceals the first tunnel and the second tunnel.

13. The bulkhead according to claim 12, further comprising a locking system that is configured to maintain the flap in the closed configuration.

14. The bulkhead according to claim 12, wherein the barricade includes a back wall that extends vertically from the base and is disposed parallel to the front wall, the first tunnel and the second tunnel extending through the back wall.

15. The bulkhead according to claim 14, wherein the barricade includes a first box and a second box that extend between the front wall and the back wall, the first box defining the first tunnel and the second box defining the second tunnel.

16. A method of securing a trailer, the method comprising:
    positioning a bulkhead with a lifting device in an interior of the trailer such that weight of the bulkhead alone maintains the position of the bulkhead within the interior of the trailer by inserting tines of the lifting device into tunnels defined through the bulkhead, the tunnels positioned 18 inches to 36 inches above a base of the bulkhead, the bulkhead having a substantially continuous major surface extending from the base to a top of the barricade that prevents human access to the interior of the trailer beyond the bulkhead;

transporting the trailer to another location; and removing the bulkhead with another lifting device from the interior of the trailer such that the interior of the trailer beyond the bulkhead is accessible.

17. The method according to claim 16, further comprising transitioning a flap of the bulkhead from an open configuration in which the tunnels are accessible to a closed configuration in which the tunnels are concealed before transporting the trailer.

18. The method according to claim 17, further comprising:

secure the flap in the closed configuration with a locking system before transporting the trailer; and visually verifying the locking system remained intact during transport after transporting the trailer and before removing the bulkhead.

\* \* \* \* \*